Dec. 22, 1925.
1,567,008
C. C. SPREEN
REFRIGERATOR THERMOMETER
Filed Dec. 11, 1924
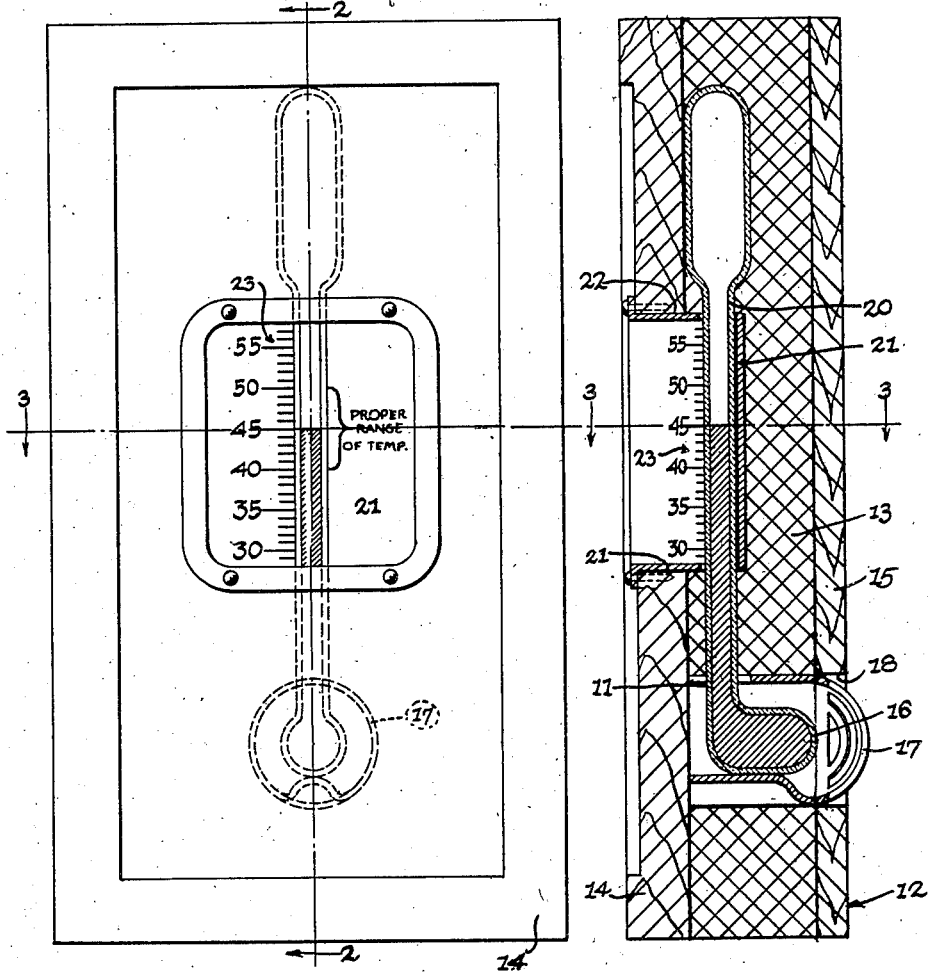
Fig. 1
Fig. 2
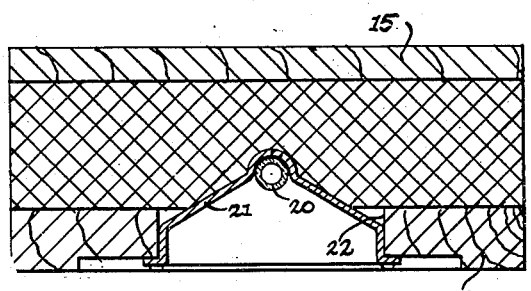
Fig. 3
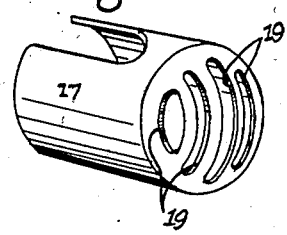
Fig. 4
Charles C. Spreen
Inventor
By Smith and Freeman
Attorneys.

Patented Dec. 22, 1925.

1,567,008

UNITED STATES PATENT OFFICE.

CHARLES C. SPREEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

REFRIGERATOR THERMOMETER.

Application filed December 11, 1924. Serial No. 755,212.

*To all whom it may concern:*

Be it known that I, CHARLES C. SPREEN, a citizen of the United States of America, and a resident of Detroit, in the county of Wayne and State of Michigan, have invented certain new and useful Improvements in Refrigerator Thermometers, of which the following is a full, clear, and exact description.

My invention relates to household refrigeration and the principal object of my invention is to provide means for indicating the temperature existing within the refrigerator. In the drawings accompanying this specification and forming a part thereof I have shown, for purposes of illustration, one form which my invention may assume. In these drawings:

Figure 1 is a front elevation of this illustrative embodiment of my invention,

Figure 2 is a section on the line 2—2 of Figure 1,

Figure 3 is a section on the line 3—3 of Figure 2, while

Figure 4 is a perspective view of the shield for the thermometer bulb.

The device herein shown comprises a thermometer 11 disposed within the refrigerator wall 12 preferably in the heat insulating material 13 lying between the front wall plate 14 and the rear wall plate 15. The bulb 16 of the thermometer 11 is spaced from the heat insulating material 13 by means of a shield 17 inserted through an aperture 18 in the inner wall plate 15 and provided at its exposed end with a plurality of apertures 19 arranged to permit the air within the refrigerator to communicate freely with the thermometer bulb 16. On the other hand, the section of the thermometer stem 20 over which the top of the thermometer fluid moves in the range of temperatures occurring during normal operation of the refrigerator is spaced from the heat insulating material 13 by a shield 21 inserted through and closing an aperture 22 in the front wall plate 14 and completely open to expose to view exteriorly of the refrigerator this portion of the stem 20 and the suitable graduations 23 which may be provided either on the thermometer tube 20, or on the shield 21 as herein shown.

In order to provide for the expansion of the thermometer fluid when the refrigerator is not in operation and when the temperature within the refrigerator may reach upwards of one hundred degrees, the upper end of the stem 20 is provided with a greatly enlarged bulb 24 adapted to afford the necessary excess space.

It will be apparent from the above description that with the construction herein shown I indicate exteriorly of the refrigerator the temperature existing within the refrigerator, that I accomplish this by means of a thermometer similar to the usual construction, and that I accomplish this result in a manner which maintains effective heat insulation between the space within the refrigerator and the space exteriorly thereof and therefore in no appreciable manner decreases the efficiency of the refrigerator. In addition, it will be apparent to those skilled in the art that the particular embodiment of my invention herein shown contains advantages other than those herein pointed out or suggested and also that the particular embodiment of my invention disclosed herein may be variously changed and modified without departing from the scope of my invention or sacrificing the advantages thereof. It will therefore be understood that the disclosure herein is illustrative only and that my invention is not limited thereto.

I claim:

1. In combination, a refrigerator wall having an inner recess extending into said wall from the inner face thereof and an outer recess extending into said wall from the outer face thereof and an aperture extending in said wall between said recesses, and a thermometer having its bulb disposed in said inner recess and its indicating portion disposed in said outer recess and connected to said bulb by a connecting stem extending from said bulb to said indicating portion through said aperture.

2. In combination, a refrigerator wall comprising an inner wall, and an outer wall, and heat-insulating material therebetween, and having an inner recess extending from the inner face of said refrigerator wall through said inner wall into said heat-insulating material, and an outer recess extending from the outer face of said refrigerator wall through said outer wall into said heat-insulating material, and an aperture extending in said heat-insulating material between said recesses; and a thermometer having its bulb disposed in said inner recess, and its indicating portion disposed in said outer recess and connected to said bulb by a connecting stem extending from said bulb to said indicating portion through said aperture.

In testimony whereof, I hereunto affix my signature.

CHARLES C. SPREEN.